US008533606B2

(12) United States Patent
Gibbon et al.

(10) Patent No.: US 8,533,606 B2
(45) Date of Patent: Sep. 10, 2013

(54) SYSTEM AND METHOD FOR PERSONALIZED HOLD

(75) Inventors: David C Gibbon, Lincroft, NJ (US); Paul Gausman, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 873 days.

(21) Appl. No.: 12/138,953

(22) Filed: Jun. 13, 2008

(65) Prior Publication Data

US 2009/0313551 A1    Dec. 17, 2009

(51) Int. Cl.
*G06F 3/00* (2006.01)

(52) U.S. Cl.
USPC .......... 715/745; 715/744; 715/747; 715/716; 379/266.01; 379/265.01; 379/265.02; 379/67.01; 379/215.01

(58) Field of Classification Search
USPC ........... 715/745; 379/215.01, 266.01, 265.02
See application file for complete search history.

(56) References Cited

U.S. PATENT DOCUMENTS

| | | | | |
|---|---|---|---|---|
| 4,788,715 A * | 11/1988 | Lee | | 379/84 |
| 5,166,974 A * | 11/1992 | Morganstein et al. | | 379/67.1 |
| 5,444,774 A * | 8/1995 | Friedes | | 379/266.01 |
| 5,875,231 A * | 2/1999 | Farfan et al. | | 379/67.1 |
| 5,884,284 A * | 3/1999 | Peters et al. | | 705/30 |
| 5,920,616 A * | 7/1999 | Hazenfield | | 379/162 |
| 5,946,378 A * | 8/1999 | Farfan | | 379/88.23 |
| 6,014,439 A * | 1/2000 | Walker et al. | | 379/266.01 |
| 6,519,571 B1 * | 2/2003 | Guheen et al. | | 705/14.66 |
| 6,606,596 B1 * | 8/2003 | Zirngibl et al. | | 704/270 |
| 6,658,093 B1 * | 12/2003 | Langseth et al. | | 379/88.17 |
| 6,714,643 B1 * | 3/2004 | Gargeya et al. | | 379/266.06 |
| 6,788,768 B1 * | 9/2004 | Saylor et al. | | 379/88.13 |
| 6,925,166 B1 * | 8/2005 | Chan | | 379/265.02 |
| 7,012,996 B2 * | 3/2006 | Polcyn | | 379/88.01 |
| 7,050,568 B2 * | 5/2006 | Brown et al. | | 379/266.01 |
| 7,151,827 B2 * | 12/2006 | Scott et al. | | 379/265.02 |
| 7,209,475 B1 * | 4/2007 | Shaffer et al. | | 370/355 |
| 7,231,035 B2 * | 6/2007 | Walker et al. | | 379/266.01 |
| 7,233,990 B1 * | 6/2007 | Debaty et al. | | 709/224 |
| 7,369,653 B2 * | 5/2008 | Dezonno et al. | | 379/265.02 |
| 7,403,605 B1 * | 7/2008 | Day | | 379/162 |
| 7,418,095 B2 * | 8/2008 | Knott et al. | | 379/266.06 |
| 7,460,652 B2 * | 12/2008 | Chang | | 379/88.18 |
| 7,688,963 B1 * | 3/2010 | Lang | | 379/215.01 |
| 7,852,372 B2 * | 12/2010 | Sohmers | | 348/150 |
| 7,856,092 B2 * | 12/2010 | Cooper et al. | | 379/201.01 |
| 2002/0146106 A1 * | 10/2002 | Himmel et al. | | 379/215.01 |
| 2002/0191775 A1 * | 12/2002 | Boies et al. | | 379/266.01 |
| 2003/0035531 A1 * | 2/2003 | Brown et al. | | 379/265.01 |
| 2004/0220726 A1 * | 11/2004 | Jin et al. | | 701/207 |
| 2006/0165104 A1 * | 7/2006 | Kaye | | 370/401 |
| 2006/0221195 A1 * | 10/2006 | Sohmers | | 348/211.11 |
| 2006/0245579 A1 * | 11/2006 | Bienfait et al. | | 379/265.02 |
| 2006/0276174 A1 * | 12/2006 | Katz et al. | | 455/410 |
| 2007/0265830 A1 * | 11/2007 | Sidhu et al. | | 704/9 |

(Continued)

*Primary Examiner* — William Bashore
*Assistant Examiner* — Reza Nabi

(57) ABSTRACT

Disclosed herein are systems, methods, and computer readable-media for contextual adaptive advertising. The method for personalized hold comprises collecting a set of data elements about a user, generating a user profile based on the set of data elements, selecting media content from one or more content repositories based on the user profile, and delivering selected media content to a device for playback to the user during noncommunicative gaps. One aspect provides further for recording a playback order of delivered media content in order to avoid playing the same media content back to back.

13 Claims, 3 Drawing Sheets

(56) References Cited

U.S. PATENT DOCUMENTS

| | | | |
|---|---|---|---|
| 2008/0022309 A1* | 1/2008 | Begeja et al. | 725/46 |
| 2008/0052105 A1* | 2/2008 | Jin et al. | 705/1 |
| 2008/0214173 A1* | 9/2008 | Preiss et al. | 455/419 |
| 2008/0250319 A1* | 10/2008 | Lee et al. | 715/716 |
| 2009/0006920 A1* | 1/2009 | Munson et al. | 714/748 |
| 2009/0313544 A1* | 12/2009 | Wood et al. | 715/716 |
| 2010/0023966 A1* | 1/2010 | Shahraray et al. | 725/34 |
| 2010/0034393 A1* | 2/2010 | Sorek et al. | 381/2 |
| 2010/0058381 A1* | 3/2010 | Begeja et al. | 725/34 |
| 2010/0098231 A1* | 4/2010 | Wohlert | 379/207.15 |
| 2010/0250773 A1* | 9/2010 | Mao | 709/231 |
| 2010/0293058 A1* | 11/2010 | Maher et al. | 705/14.66 |
| 2010/0303440 A1* | 12/2010 | Lin et al. | 386/241 |
| 2010/0306023 A1* | 12/2010 | Grigoroscuta et al. | 705/10 |

* cited by examiner

SYSTEM AND METHOD FOR PERSONALIZED HOLD

BACKGROUND OF THE INVENTION

1. Field of the Invention

The present invention relates to telecommunications and more specifically to personalizing what users hear when placed on hold.

2. Introduction

When a consumer purchases a product and something goes wrong with that product, one of the first resources the consumer turns to is calling customer service. When a consumer has a question about a bank statement, utility bill, etc., the consumer calls customer service. Toll-free customer service hotlines are commonplace. Some companies use automated systems to service consumer requests for information, while others rely on person to person communication. Non-automated person to person communication has a serious shortcoming that becomes obvious when more people are calling in than people taking calls. When this happens, consumers are typically placed on hold and asked to wait for the next available representative.

When a consumer is placed on hold, music is played. The music can be looped, but that leads to annoying repetition which can grate the nerves of an already irked consumer. The music may be fuzzy or scratchy, further annoying the consumer. Sometimes the consumer simply doesn't share the same musical taste as the person who selected the hold music or finds the hold music offensive.

From a marketing standpoint, the consumer on hold is a captive audience. The time is ripe for filling with some kind of productive or entertaining content other than content that simply fills a time gap before a customer service representative becomes available. Accordingly, what is needed in the art is an improved way of providing media for people waiting on hold.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for contextual adaptive advertising by collecting a set of data elements about a user, generating a user profile based on the set of data elements, selecting media content from one or more content repositories based on the user profile, and delivering selected media content to a device for playback to the user during noncommunicative gaps. Preferably, the noncommunicative gaps occur during a two-way communication between two people or a person and a spoken dialog system.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
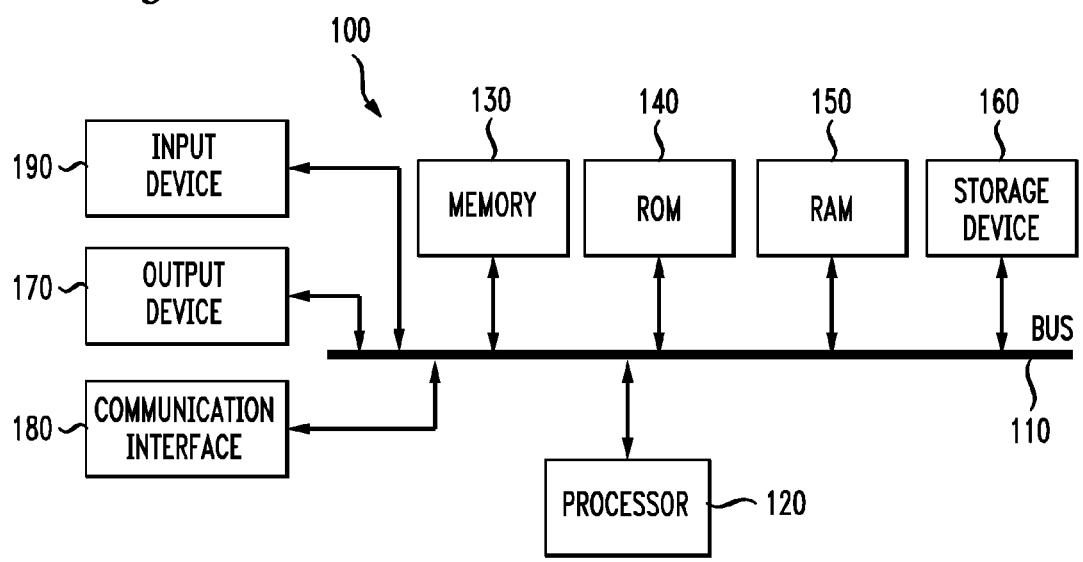
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
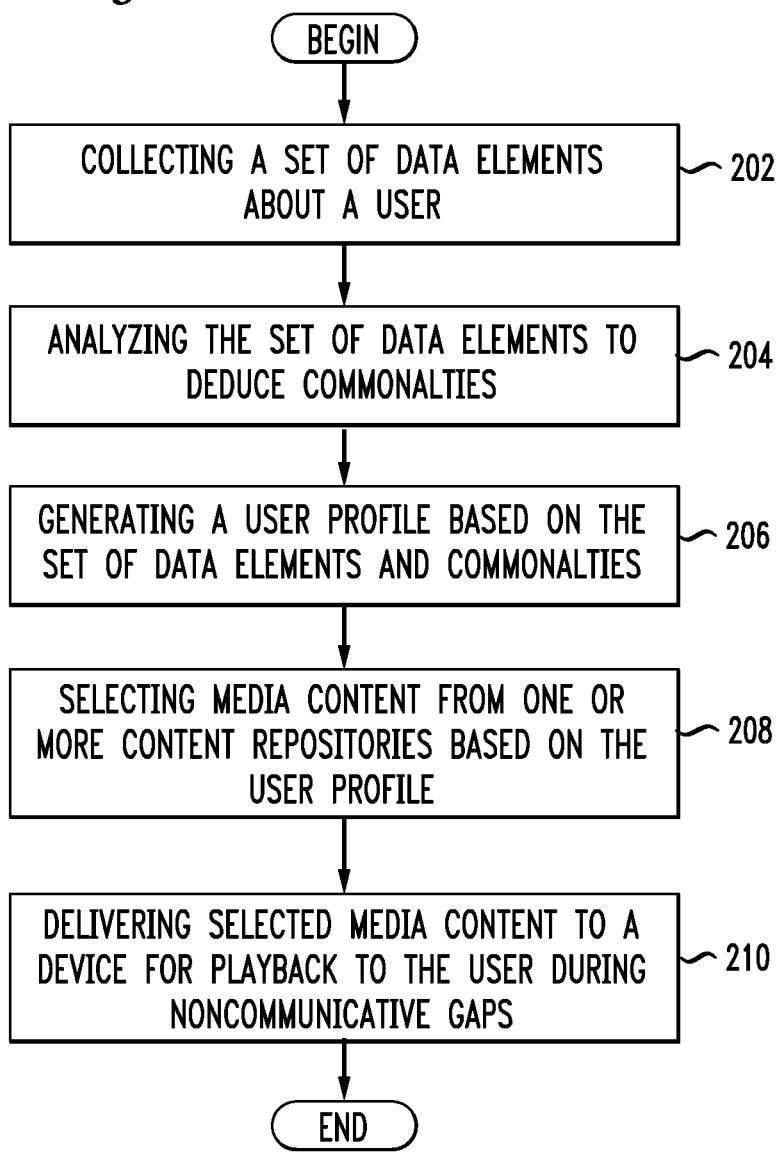
FIG. 2 illustrates a method embodiment for providing personalized content during noncommunicative gaps.

FIG. 2 illustrates a method embodiment for providing personalized content during noncommunicative gaps. Noncommunicative gaps are portions of a dialog where no two-way communication is happening. The dialog may be between two or more people or between a person and a spoken dialog system. In one aspect of this method, a dialog is a telephone call to customer service or technical support. Being placed on hold while waiting to speak with someone is the noncommunicative gap. First, the method collects a set of data elements about a user (202). In one aspect of the method, data elements about a user include explicit user preferences, implicit user preferences, likes, dislikes, a called phone number, an originating phone number, information related to the issue they called technical support about, their account balance or account information, or usage patterns. In one aspect, implicit user preferences are ascertained by where the user is calling. If the user is calling customer support regarding a snowboard, media content is selected based at least in part on that knowledge. A user profile made up of the set of data elements may be assembled and stored. Data elements can be gathered all at one time or at multiple times. As further information is collected, existing data elements may be refined or updated. Real-time user data may be used to refine implicit user preferences, likes, or dislikes. One source of real-time user data is user navigation through songs in a playlist. If a user consistently skips one song each time it is played, user preferences regarding that song can be updated and that song can eventually be removed from the playlist.

In one aspect, users specify explicit preferences which override any contradictory implicit user preferences. In the snowboard example where the user doesn't like the usual snowboard-related media, an explicit user preference for only country music would override an implicit user preference for punk rock. In another aspect, a deaf user specifies explicitly that closed captions be provided, where possible and available. This explicit preference is used to override any implicit user preferences if the implicit preferences would select media content without closed captions.

In another aspect, user preferences, both implicit and explicit, are grouped on a device-by-device basis. One application for device-by-device grouping is a user who specifies no hold music on their cell phone and specifies music from their favorite band on their home phone. Hardware limitations, physical location, social group, usage habits, etc. all provide reasons and situations where grouping user preferences on a device-by-device basis may be desirable.

Second, optionally, the method analyzes the set of data elements to deduce commonalities (204). This step applies where multiple data elements exist. In contrast, a caller may simply specify that they like a particular genre such that there would only be a single data element or a small number of data elements if one considers the originating phone number and other data. In this case, the process of deducing commonalities is not applicable. Third, the method generates a user profile based on the set of data elements (and commonalities if applicable) (206). Fourth, the method selects media content from one or more content repositories based on the user profile (208). Media content can be advertisements, premium programming, selections from a personal media library, or serialized content. In one embodiment, a telephone company provides advertisements instead of hold music for a consumer for free, while offering to provide personalized media content instead of hold music as a subscription service for a fee. Media content can take the forms of music, speech, video, pictures, or mixed media. Speech media can include serialized audio books, news, stock quotes, weather updates, etc. In the aspect including serialized audio books and other media designed to be consumed in order, placemarks are used to record where media content playback starts and stops. In a situation where a user is placed on hold multiple times through a telephone call, the audio book being played during hold times is effectively paused until the next hold time. The preceding sentence or two may be played back first to refresh the memory of the user. Placemarks can be saved, deleted, moved, created, or copied.

Video media can include video on a computer screen in the case of a VoIP telephone call. Mixed media can include audio and video displays on the same device or on different devices. While applicable to hold music in a telephone call, other applications exist beyond audio, such as displaying photographic advertisements on a cell phone screen while on hold or displaying video advertisements on a video conferencing screen while on hold.

Fifth, the method delivers selected media content to a device for playback to the user during noncommunicative gaps (210). Media delivery can be accomplished by streaming, progressive download, or caching for later playback. Media content can be stored locally on a device or stored in a digital locker in a network or some combination. Media content can be drawn from a personal media library, such as those maintained by Windows Media Player or Apple iTunes. As media content is played back to the user, a record may be kept of what media the user has heard recently so as to avoid repeating the same media too frequently. The media content playback order may be recorded in order to avoid playing the same media content back to back.

In one embodiment, an agent acts as a host to greet the user, introduce media content, or transition between media content. In the case of audio media content, the agent may be accomplished through pre-recorded messages or speech synthesis. For example, an agent could introduce and transition to the media content like this: "Hello Tom. Sorry, but Qwest has put you on hold. While you wait, here's your favorite song from 1971, Stairway to Heaven."

One aspect of the method allows for a user to navigate through delivered media content. The agent can provide instructions for navigation such as "Press * to go to the previous song. Press # to go to the next song. Press 0 to edit your preferences." Navigation is not limited to button presses and may include vocal commands, mouse gestures, clicks, and other digital or analog inputs or combinations of digital or analog inputs.

Figure 3:
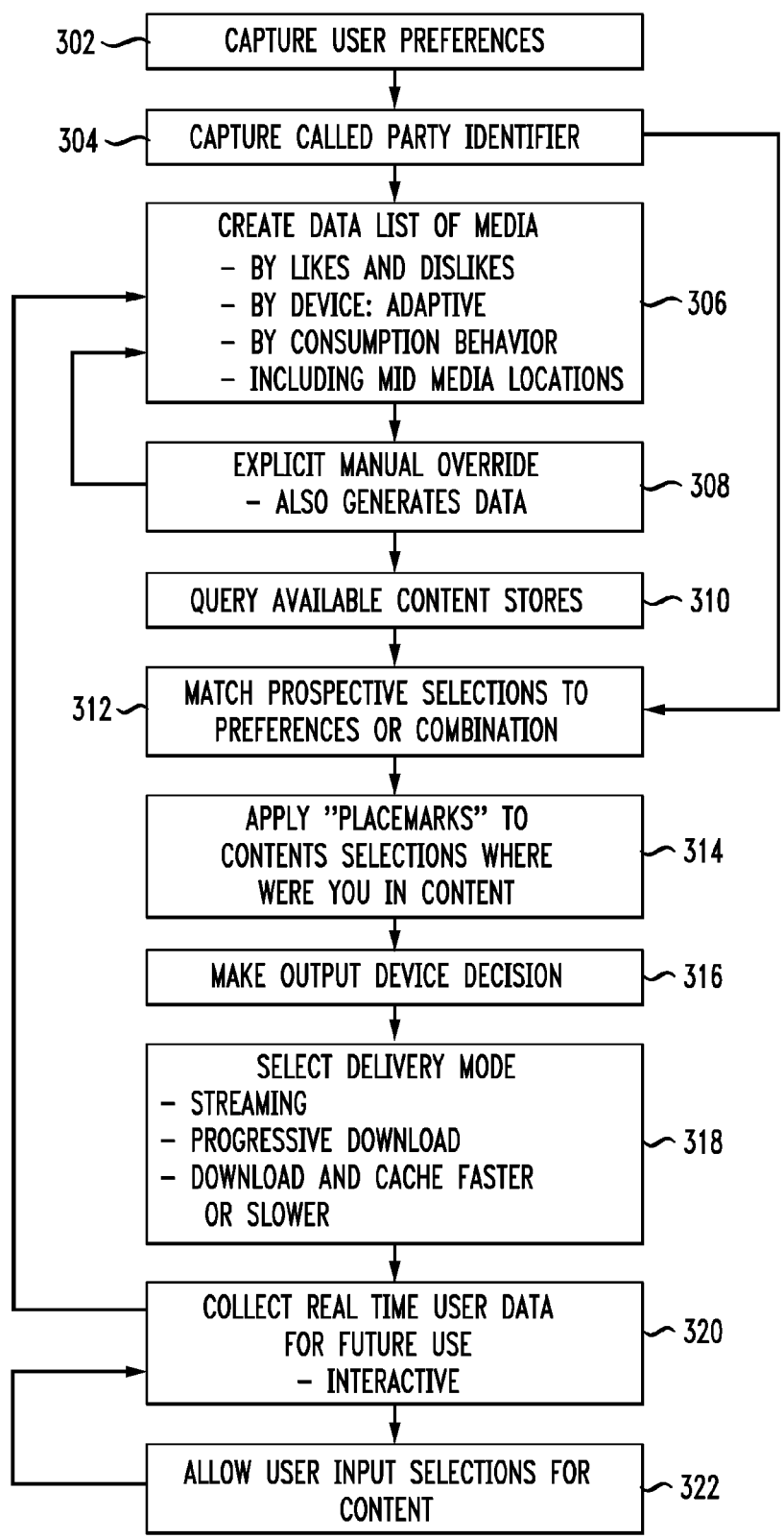
FIG. 3 illustrates a flow chart for content selection.

FIG. 3 illustrates a flow chart for content selection in an exemplary embodiment of the method. The system first captures user preferences (302). The system can capture user preferences in an initial enrollment phase or at later times. Capturing user preferences can be a continuous process rather than a single event. Next, the system captures a called party identifier (304). The system of the exemplary embodiment deals with telephone calls, and thus captures the number the user is calling or is being called from, depending on the situation. In one fact pattern, one user to a call may mute the call or be unavailable due to a pause or because they are recording a message off-line. The noncommunicative time may be filled with media content is disclosed herein. Domain specific media content can be selected based on who you are waiting to talk to. For example, if you are calling Qwest or the Department of Defense, specific media content may be selected for playback that would be of interest to a person with your profile who has business with Qwest or the Department of Defense.

The system then creates a data list of media based on implicit preferences (306), as discussed above. The system sorts the data list of media by likes and dislikes, adaptively by device, by consumption behavior, and can include mid-media locations. The data list of media is then filtered by explicit manual override preferences (308). The system removes any media from the implicitly generated data list that is explicitly prohibited. Likewise, the system can add or alter media in the data list if explicit manual preferences so dictate. The system can apply explicit preferences in a persistent or global manner so the explicit preferences are used in every situation or the system can apply explicit preferences on a per session basis.

After the data list of media is generated and filtered by explicit preferences, the system queries available content stores (310) to see which media content is available and of the available media content, which is suitable for playback. The system can have at its disposal a personal media library residing on a device, subscription-based media content, media stored in a network or digital locker, or any combination. After the system determines exactly what media content is available, it matches the prospective selections to preferences or combinations of preferences (312). This step can also be performed immediately after capturing the called party identifier (304), if implicit or explicit preferences do not exist or are otherwise unavailable.

The system applies placemarks to media content selections (314) to resume playback in the same place that playback stopped previously. This aspect is useful in serialized media where random playback is not desired, such as audio books or motion pictures. Playback may resume a period of time prior to the actual placemarks as a way to refresh the memory of the listener and remind him or her what is going on in the serialized media content.

At this point, the system makes a decision of which output device to use (316). The output device can be a telephone, a video screen, a speaker, or any other device or combination of devices capable of receiving and playing media content. Closely associated with this step is selecting the delivery mode (318) for the media content. The system can choose from streaming, progressive download, download and cache, or any combination based on the recipient device and/or user preferences. For example, if the system outputs to a standard touch tone telephone without memory or other storage, then streaming is the only option the telephone can handle. If the system outputs to a computer for a VoIP telephone call, then any of streaming, progressive download, or download and cache techniques could be selected. Downloading and caching can be performed faster or slower than real time, depending on the device, connection speed, or other considerations.

As media is played back on the output device, the system collects real time user data for future use (320). The future use could be far in the future or could be almost immediately, allowing the system to perform its functions interactively with a user. Real time user data includes the volume the user listens to the media at, positioning of the phone, how a user navigates through the media, etc. The system allows user input selections for content (322) during playback. The user can skip media, replay media, alter explicit preferences, etc. Some example of how a user interacts with such a system are touch tone buttons on a telephone, speech commands, mouse gestures, email, text messages, stylus input, etc. User input and navigation history can be recorded and analyzed to extrapolate implicit user preferences. In the case of a subscription fee-based model, user input can be the basis of recommendations for access to additional media content that the user can purchase. In this embodiment, the agent discussed above could say to the user "You have shown interest in Green Day. Would you like to purchase the song Minority by Green Day to add to your customized hold music for $1?" The system records real time user interaction with such a suggestion and can base future media suggestions on the gleaned information.

The principles described herein can work for any gap in communication. For example, when a user talking on a cell phone drives through a tunnel or enters an elevator she may temporarily lose reception. During the gaps caused by a loss of reception, media content can be pre-sent to the local device for playback during the communication gap until reception is restored. Personalized media content can be marked for use with unexpected gaps in communication.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in all types of call centers, telephone service providers, video content for video phones, etc. Those skilled in the art will readily recognize various modifications and changes that may be made to the present invention without following the example embodiments and applications illustrated and described herein, and without departing from the true spirit and scope of the present invention.

We claim:

1. A method comprising:
   generating a user profile based on a set of data elements collected about a user and a called party, wherein:
   the set of data elements comprises explicit user preferences and implicit user preferences, the explicit user preferences overriding the implicit user preferences, and the explicit user preferences and the implicit user preferences being grouped on a device-by-device basis;
   selecting local media content from a personal media library based on at lest a portion of the user profile and marked media content for use with unexpected noncommunicative gaps, to yield selected media content;
   recording a playback order of the selected media content to avoid playing a same portion of the selected media content back to back; and
   causing playback of the selected media content using the playback order during a noncommunicative gap in a two-way communication between the user and the called party, wherein placemarks are used to record where the playback of the selected media content starts and stops.

2. The method of claim 1, wherein the selected media content comprises one of advertisements, premium programming, and serialized content.

3. The method of claim 1, wherein the method is performed as part of a subscription service.

4. The method of claim 1, wherein the selected media content comprises one of music, speech, video, pictures, and mixed media.

5. The method of claim 1, wherein the selected media content is delivered by one of streaming, progressive download, and caching.

6. The method of claim 1, wherein real time user data is used to refine one of the implicit user preferences, the likes, and the dislikes.

7. The method of claim 1, wherein an agent acts as a host for one of greeting the user, introducing the selected media content, and transitioning between portions of the selected media content.

8. The method of claim 1, wherein the user navigates through the selected media content.

9. The method of claim 1, further comprising analyzing the set of data elements to deduce commonalities and wherein generating the user profile is further based on the commonalities.

10. A system comprising:
    a processor; and
    a computer readable storage medium having instructions stored which, when executed by the processor, cause the processor to perform operations comprising:
      generating a user profile based on a set of data elements collected about a user and a called party, wherein:
        the set of data elements comprises explicit user preferences and implicit user preferences, the explicit user preferences overriding the implicit user preferences, and the explicit user preferences and the implicit user preferences being grouped on a device-by-device basis;
      selecting local media content from a personal media library based on a portion of the user profile and marked media content for use with unexpected noncommunicative gaps, to yield selected media content;
      recording a playback order of the selected media content to avoid playing a same portion of the selected media content back to back; and
      causing playback of the selected media content using the playback order during a noncommunicative gap in a two-way communication between the user and the called party, wherein placemarks are used to record where the playback of the selected media content starts and stops.

11. The system of claim 10, wherein the selected media content comprises one of advertisements, premium programming, and serialized content.

12. The system of claim 10, wherein an agent acts as a host for one of greeting the user, introducing the selected media content, and transitioning between the selected media content.

13. A non-transitory computer-readable medium having instructions stored which, when executed by a processor, cause the processor to perform operations comprising:
    generating a user profile based on a set of data elements collected about a user and a called party, wherein:
      the set of data elements comprises explicit user preferences and implicit user preferences, the explicit user preferences overriding the implicit user preferences, and the explicit user preferences and the implicit user preferences being grouped on a device-by-device basis;
    selecting local media content from a personal media library based on at least a portion of the user profile and marked media content for use with unexpected noncommunicative gaps, to yield selected media content;

recording a playback order of the selected media content to avoid playing a same portion of the selected media content back to back; and causing playback of the selected media content using the playback order during a noncommunicative gap in a two-way communication between the user and the called party, wherein placemarks are used to record where the playback of the selected media content starts and stops.

\* \* \* \* \*